United States Patent
Hong

(10) Patent No.: US 12,177,318 B2
(45) Date of Patent: Dec. 24, 2024

(54) INFORMATION ACQUIRING METHODS AND APPARATUSES, AND ELECTRONIC DEVICES

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 346 days.

(21) Appl. No.: 17/760,653

(22) PCT Filed: Sep. 17, 2019

(86) PCT No.: PCT/CN2019/106195
§ 371 (c)(1),
(2) Date: Mar. 15, 2022

(87) PCT Pub. No.: WO2021/051269
PCT Pub. Date: Mar. 25, 2021

(65) Prior Publication Data
US 2022/0337677 A1    Oct. 20, 2022

(51) Int. Cl.
*H04L 67/63* (2022.01)
*H04W 8/22* (2009.01)

(52) U.S. Cl.
CPC ............ *H04L 67/63* (2022.05); *H04W 8/22* (2013.01)

(58) Field of Classification Search
CPC ........... H04L 67/63; H04L 69/24; H04W 8/22
See application file for complete search history.

(56) References Cited

U.S. PATENT DOCUMENTS

| 6,427,173 B1 * | 7/2002 | Boucher ............... H04L 67/62 709/250 |
| 10,264,428 B2 | 4/2019 | Egner |

(Continued)

FOREIGN PATENT DOCUMENTS

| CN | 102111815 A | 6/2011 |
| CN | 105792283 A | 7/2016 |
| CN | 109257152 A | 1/2019 |

OTHER PUBLICATIONS

State Intellectual Property Office of the People's Republic of China, Office Action and Search Report Issued in Application No. 2019800019920, Oct. 9, 2021, 12 pages. (Submitted with Machine/Partial Translation).

(Continued)

*Primary Examiner* — Kashif Siddiqui
(74) *Attorney, Agent, or Firm* — Volpe Koenig

(57) ABSTRACT

An information acquiring method is provided. The method is applied to a first network side device. The method includes acquiring second capability information for processing data sent by at least one second network side device. According to embodiments of the present disclosure, in addition to communicating with a terminal, the first network side device can acquire the second capability information for processing data from at least one second network side device. Based on the second capability information, the first network side device can determine the capability of the second network side device for processing data. Further, when there is to-be-processed data in the first network side device, the first network side device can determine, according to the second capability information, which second network side device can process the data, and then can send the data to the second network side device for processing.

18 Claims, 10 Drawing Sheets

(56) References Cited

U.S. PATENT DOCUMENTS

| | | |
|---|---|---|
| 2007/0280159 A1 | 12/2007 | Liu et al. |
| 2011/0045834 A1* | 2/2011 | Kim .................. H04W 36/0022 |
| | | 455/445 |
| 2013/0114406 A1 | 5/2013 | Wu |
| 2013/0336208 A1* | 12/2013 | Billau ................ H04W 36/125 |
| | | 370/328 |
| 2014/0082697 A1* | 3/2014 | Watfa ................. H04L 63/0485 |
| | | 726/3 |
| 2016/0219475 A1* | 7/2016 | Kim .................. H04W 36/0009 |
| 2018/0184231 A1 | 6/2018 | Egner |
| 2023/0318932 A1* | 10/2023 | Ferzli ..................... G06N 3/098 |
| | | 709/220 |

OTHER PUBLICATIONS

ISA State Intellectual Property Office of the People's Republic of China, International Search Report Issued in Application No. PCT/CN2019/106195, Jun. 15, 2020, WIPO, 4 pages.

* cited by examiner

```
┌─────────────────────────────────────────────────┐
│ Determine, from the plurality of pieces of second│
│ capability information, second capability information that │ ~ S301
│ satisfies most sub-requirements in the plurality of sub- │
│ requirements as the target capability information │
└─────────────────────────────────────────────────┘
```

FIG. 5

```
┌─────────────────────────────────────────────────┐
│ Determine, from the plurality of pieces of second│
│ capability information, second capability information that │ ~ S301
│ satisfies most sub-requirements in the plurality of sub- │
│ requirements as the target capability information │
└─────────────────────────────────────────────────┘
                        ↓
┌─────────────────────────────────────────────────┐
│ Determine particular ones of sub-requirements from the │
│ sub-requirements satisfied by the plurality of pieces of │ ~ S302
│ candidate capability information │
└─────────────────────────────────────────────────┘
                        ↓
┌─────────────────────────────────────────────────┐
│ Determine, from the particular ones of the sub- │ ~ S303
│ requirements, a sub-requirement with a highest priority │
└─────────────────────────────────────────────────┘
                        ↓
┌─────────────────────────────────────────────────┐
│ Determine, from the plurality of pieces of candidate │
│ capability information, candidate capability information │ ~ S304
│ that satisfies the sub-requirement with the highest priority │
│ as the target capability information │
└─────────────────────────────────────────────────┘
```

FIG. 6

```
┌─────────────────────────────────────────────────┐
│ Determine, from the plurality of pieces of second │
│ capability information, second capability information that │ ~ S305
│ satisfies a sub-requirement with a highest priority as the │
│ target capability information │
└─────────────────────────────────────────────────┘
```

FIG. 7

INFORMATION ACQUIRING METHODS AND APPARATUSES, AND ELECTRONIC DEVICES

CROSS REFERENCE TO RELATED APPLICATIONS

The present application is a U.S. National Stage of International Application No. PCT/CN2019/106195 filed on Sep. 17, 2019, the contents of which are incorporated herein by reference in their entireties for all purposes.

TECHNICAL FIELD

The present disclosure relates to the field of communication technologies, and in particular, to information acquiring methods and apparatuses, and electronic devices.

BACKGROUND

In current scenarios where a terminal communicates with a network side device such as a base station, the main function of the network side device is to configure the terminal with time-frequency resources for communication. The network side device generally does not play any other role.

However, with the advance of communication technologies, the amount of data to be processed by terminals is getting larger and larger. At the same time, the performance capabilities of network side devices is greatly improved. If a network side device is used only to configure time-frequency resources for the terminal, the full performance capability of the network side device.

SUMMARY

In view of this, embodiments of the present disclosure provide information acquiring methods and apparatuses, and electronic devices to solve the technical problems in the related art.

According to a first aspect of the embodiments of the present disclosure an information acquiring method is provided. In this aspect the method is implemented in a first network side device. The method includes acquiring from each of a plurality of second network side devices, respective, corresponding second capability information indicating data processing capability of each corresponding network side device.

In some examples the method further includes: Receiving, from a terminal, to-be-processed data and a first request for processing the to-be-processed data. The first request includes preset requirements for processing the to-be-processed data. The method further includes determining which of a plurality of pieces of second capability information, satisfy the preset requirements. The determined pieces of second capability information are target capability information. The method includes sending the to-be-processed data to a target network side device corresponding to the target capability information for processing.

According to a second aspect of embodiments of the present disclosure, an information acquiring apparatus is provided. The apparatus is implemented a first network side device. The apparatus includes an information acquiring module configured to acquire from more than one second network side device, second capability information for processing data. In some examples, the apparatus further includes a first receiving module configured to receive from a terminal, to-be-processed data and a first request for processing the to-be-processed data. The first request includes preset requirements for processing the to-be-processed data. A target determining module is configured to determine target capability information that satisfies the preset requirements from a plurality of pieces of second capability information. A data sending module is configured to send the to-be-processed data to a target network side device for processing. The target network side device is identified in the corresponding target capability information.

According to a third aspect of the embodiments of the present disclosure, an electronic device is provided. The device includes a processor and a memory for storing processor executable instructions, whereby the processor is configured to implement the information acquiring method according to any of the embodiments as described herein.

According to the embodiments of the present disclosure, in addition to communicating with a terminal, the first network side device can acquire the second capability information for processing data from more than one second network side device, and based on the second capability information, the first network side device can determine the capability of the second network side device for processing data. Further, when there is to-be-processed data in the first network side device, the first network side device can determine according to the second capability information, which second network side device has capability to process the data. The first network side device can then send the data to the second network side device for processing. This expands the capabilities of the first network side device with respect to communicating with the terminal, and also facilitates the full utilization of the performance capability of the first network side device and the second network side device.

BRIEF DESCRIPTION OF THE DRAWINGS

In order to illustrate the technical solutions in the embodiments of the present disclosure more clearly, the drawings referenced in the description of the embodiments will be briefly introduced. The drawings in the following description are only some of the many possible embodiments within the scope of the present disclosure. For those of ordinary skill in the art, other drawings can be derived from these drawings without creative efforts.

FIG. 5 is a c flowchart of determining target capability information that satisfies preset requirements from a plurality of pieces of second capability information according to an embodiment of the present disclosure;

FIG. 6 is a flowchart of determining target capability information that satisfies preset requirements from a plurality of pieces of second capability information according to an embodiment of the present disclosure;

FIG. 7 is a flowchart of determining target capability information that satisfies preset requirements from a plurality of pieces of second capability information according to an embodiment of the present disclosure;

DETAILED DESCRIPTION OF THE EMBODIMENTS

The technical solutions in the embodiments of the present disclosure will be clearly and completely described below with reference to the drawings in the embodiments of the present disclosure. The described embodiments are only a part but not all of the possible embodiments within the scope of the present disclosure. Based on the embodiments described in the present disclosure, all other embodiments obtained by those of ordinary skill in the art without creative efforts are intended to fall within the protection scope of the present disclosure.

Figure 1:
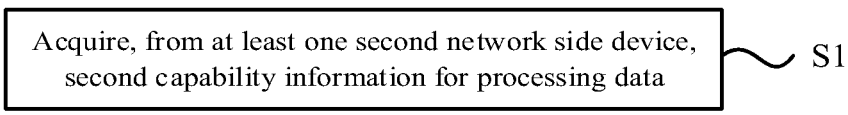
FIG. 1 is a flowchart illustrating an information acquiring method according to an embodiment of the present disclosure.

FIG. 1 is a flowchart illustrating a step in an information acquiring method according to an embodiment of the present disclosure. The information acquiring method in this embodiment can be applied to a first network side device. The first network side device includes, but is not limited to, a base station, a core network and a multi-access edge computing server. The first network side device can communicate with a terminal which is used as user equipment. The terminal includes, but is not limited to, an electronic device such as a mobile phone, a tablet computer and a wearable device. The first network side device and the terminal can communicate with each other based on 4G LTE (Long Term Evolution) or 5G NR (New Radio).

The terminal and the first network side device can have an AI (Artificial Intelligence) capability. Based on the AI capability, the terminal can quickly process information such as images, videos, language and text so as to quickly respond to user operations. The first network side device having AI capability can process a larger amount of data than the terminal can process, and also has a quicker processing speed than has the terminal. For example, the first network side device having AI capability can use a large amount of data as a sample for machine learning to obtain a model for processing data.

As shown in FIG. 1, the information acquiring method may include the following steps: at step S1, second capability information, which is information indicating a capability of a second network side device (including, but not limited to, a base station, a core network and a multi-access edge computing server) for processing data, is sent by the at least one second network side device to a first network side device, whereby the second capability information is acquired by the first network side device.

In some examples, the first network side device can acquire the second capability information from at least one second network side device, Based on the second capability information, the first network side device can determine the data processing capability of the at least one second network side device. The capabilities indicated by the second capability information include, but are not limited to, data processing speed and latency of the second network side device, the amount of data that can be processed by the second network side device, and the like.

According to some examples of the present disclosure, in addition to communicating with a terminal, the first network side device can acquire from the at least one second network side device, second capability information indicating the data processing capability of the at least one second network side device. Based on the second capability information, the first network side device can determine the capability of the second network side device for processing data. When there is to-be-processed data in the first network side device the first network side device can determine, according to the second capability information, which at least one second network side device has a capability to process the to-be-processed data. The first network side device can then send the data to the second network side device that has a capability for processing the data. In that manner, the capabilities of the first network side device are expanded with respect to communicating with the terminal, and the performance capabilities of the first network side device and the second network side device are more fully utilized.

It should be noted that the second capability information for processing data sent by at least one second network side device can be actively acquired (active acquisition or passively acquired (passive acquisition). The term 'active acquisition' refers to the fact that the first network side device requests the second capability information. For example, when the first network side device is to acquire the second capability information, the first network side device sends to the at least one second network side device, a request to acquire the second capability information from at least one second network side device. The first network side device then receives the second capability information sent by the at least one second network side device. The term 'passive acquisition' refers to the fact that at least one second network side device sends (for example, periodically or when receiving an instruction) the second capability information to the first network side device without the first network side device requesting the second capability information. In that context, the first network side device passively receives the second capability information sent by the at least one second network side device.

In an example, the first network side device is a first base station and the second network side device is a second base station. The second base station can send the second capability information to the first base station through an interface with the first base station. For example, when the first base station is to acquire the second capability information of the second base station, the first base station can send a request for the second capability information in a message XN SETUP REQUEST. The second base station can determine, based on the content of the message XN SETUP REQUEST, that the first base station is requesting to acquire the second capability information. The second base station can then send to the first base station, an XN SETUP RESPONSE message carrying the second capability information.

An example of the structure of the message XN SETUP REQUEST is shown below:

cessing the to-be-processed data. The first request includes preset requirements for processing the to-be-processed data.

At step S3, the first base station determines which of a plurality of pieces of second capability information satisfies the preset requirements based on the plurality of pieces of second capability information. The second capability information that satisfies the present requirements becomes target capability information. At step S4, the to-be-processed data is sent for processing to a target network side device corresponding to the target capability information. The target network side device is a second network side device capable of meeting the preset requirements. In some examples, the terminal can send the to-be-processed data and the first request for processing the to-be-processed data to the first network side device. Based on the first request, the first network side device can determine that the terminal requires a network side device having a capability to process the to-be-processed data in accordance with the preset requirements. The preset requirements include, but are not limited to, the latency allowed for processing the to-be-processed data, the speed for processing the to-be-processed data, the amount of the to-be-processed data, and the like.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Global NG-RAN Node ID | M | | 9.2.2.3 | | YES | reject |
| TAI Support List | M | | 9.2.3.20 | List of supported TAs and associated characteristics. | YES | reject |
| AMF RegionInformation | M | | 9.2.3.83 | List of all the AMF Regions to which the NG-RAN node belongs. | YES | reject |
| List of Served Cells NR | | 0 . . . <maxnoof CellsinNG-RAN node> | | Complete list of cells served by the gNB | YES | reject |
| >Served Cell Information NR | M | | 9.2.2.11 | | — | |
| >Neighbour Information NR | O | | 9.2.2.13 | | — | |
| >Neighbour Information E-UTRA | O | | 9.2.2.14 | | — | |
| List of Served Cells E-UTRA | | 0 . . . <maxnoof CellsinNG-RAN node> | | Complete list of cells served by the ng-eNB. | YES | reject |
| >Served Cell Information E-UTRA | M | | 9.2.2.12 | | — | |
| >Neighbour Information NR | O | | 9.2.2.13 | | — | |
| >Neighbour Information E-UTRA | O | | 9.2.2.14 | | — | |
| Interface Instance Indication | O | | 9.2.2.39 | | YES | reject |
| AI Capability | O | | 9.X.X.X | | | |

The second base station, upon receiving the message XN SETUP REQUEST, can determine based on the contents of the 'AI Capability' portion of the XN SETUP REQUEST message, that the first base station is requesting to acquire from the second base station, information about the AI capability of the second base station.

Figure 2:
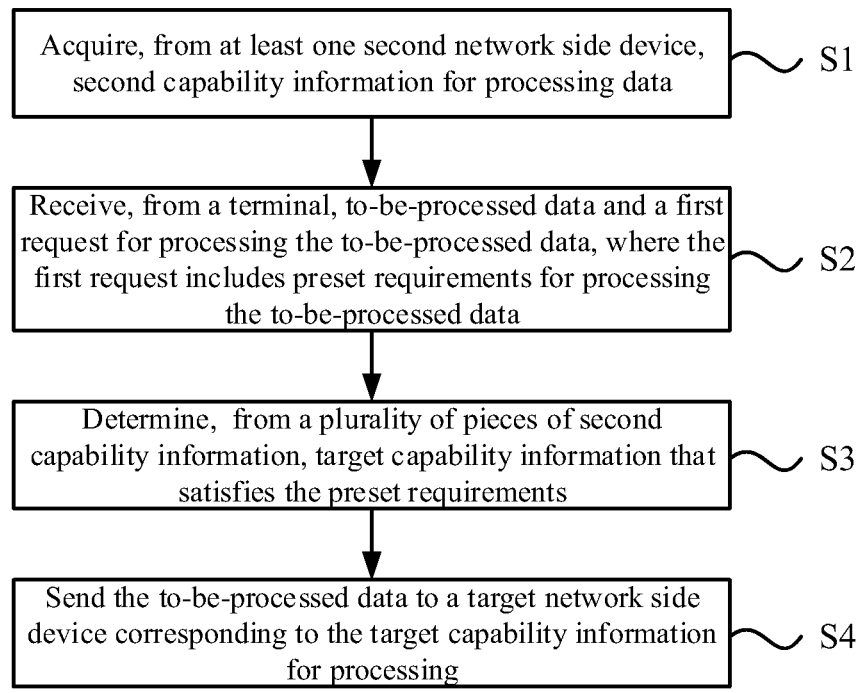
FIG. 2 is a flowchart illustrating another information acquiring method according to an embodiment of the present disclosure.

FIG. 2 is a flowchart illustrating another information acquiring method according to an embodiment of the present disclosure. As shown in FIG. 2, the information acquiring method may further include step S2 in which the first network side device, e.g., a base station receives from a terminal, to-be-processed data and a first request for pro- The first network side device can determine the target capability information that satisfies the preset requirements from the plurality of pieces of second capability information. For example, the second capability information indicates the speed capability of a corresponding second network side device for processing data, and the preset requirements include the speed for processing to-be-processed data. In that case, it can be determined which of the plurality of pieces of second capability information indicates a capability for processing data at a speed greater than the preset requirements for speed for processing to-be-processed data. That piece of second capability information is referred to herein as the target capability information.

The second network side device corresponding to the target capability information is the target network side device. The speed of the target network side device for processing data satisfies the requirement of the to-be-processed data for processing speed. Therefore, the to-be-processed data can be sent to the target network side device for processing thereby ensuring that the to-be-processed data can be processed in a manner that satisfies the preset requirements.

Figure 3:
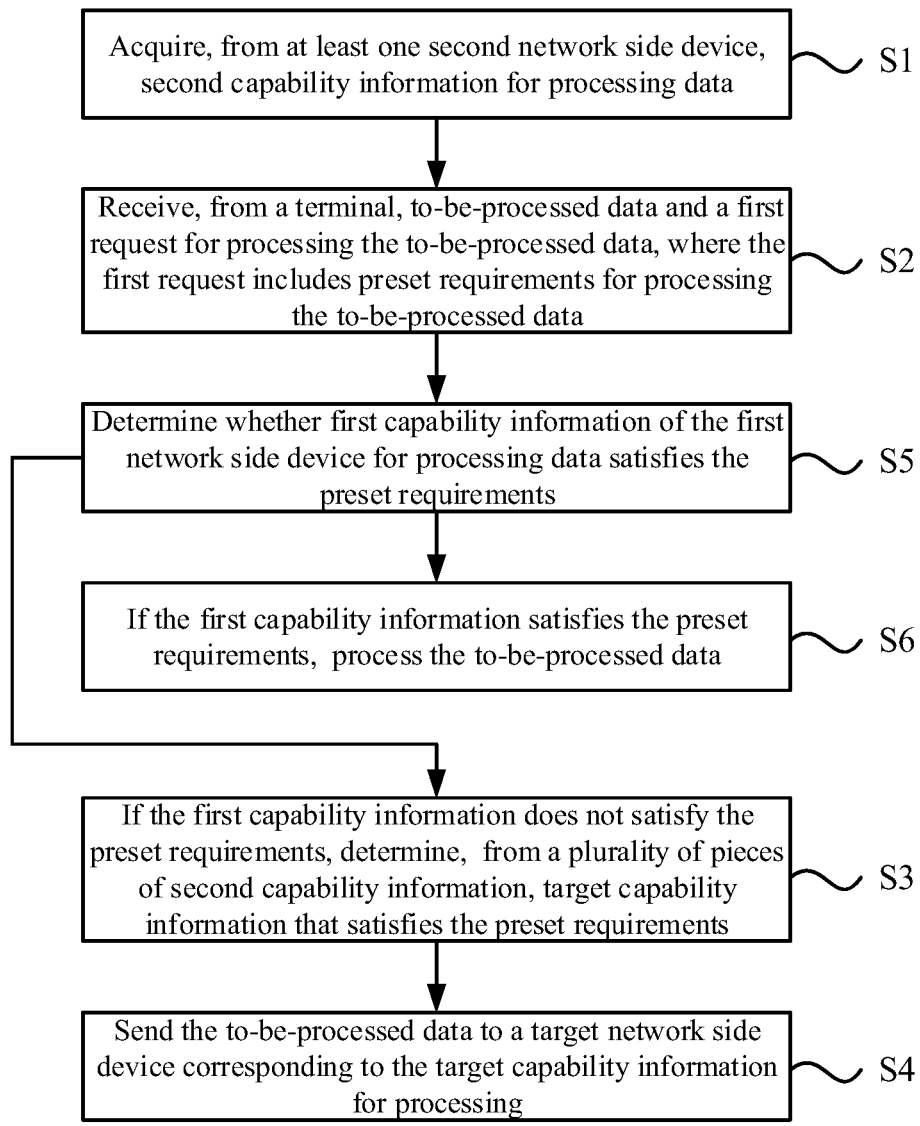
FIG. 3 is a flowchart illustrating another information acquiring method according to an embodiment of the present disclosure.

FIG. 3 is a flowchart illustrating another information acquiring method according to an embodiment of the present disclosure. As shown in FIG. 3, before determining the target capability information, the method further includes step S5, in which it is determined whether first capability information indicates the first network side device itself has a capability for processing data in a manner that satisfies the preset requirements. At step S6, if the first capability information satisfies the preset requirements, the to-be-processed data is processed by the first network side device. If the first capability information does not satisfy the preset requirements, step S3 is performed, i.e., target capability information that satisfies the preset requirements is determined from the plurality of pieces of second capability information.

In some examples, the first network side device can first determine whether its own capability information indicates it (the network side device) has capability for processing data to satisfy the preset requirements. In the case where the first capability information indicates the first network side device satisfies the preset requirements, the first network side device can process the to-be-processed data without sending the to-be-processed data to the second network side device for processing, thereby avoiding additional overhead. In the case where the first capability information indicates the first network side device does not have a capability to satisfy the preset requirements, the first network side device sends the to-be-processed data to the second network side device for processing, thereby ensuring that the to-be-processed data is processed in a manner that satisfies the preset requirements.

Figure 4:
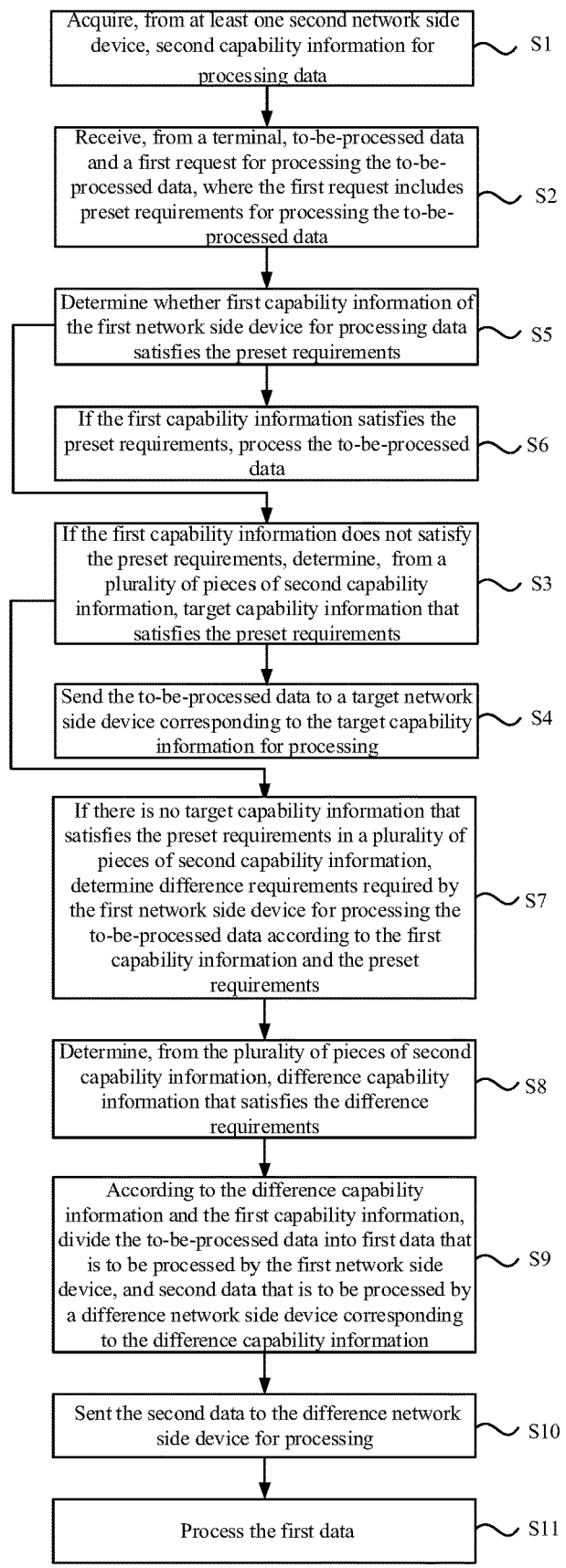
FIG. 4 is a flowchart illustrating another information acquiring method according to an embodiment of the present disclosure.

FIG. 4 is a flowchart illustrating another information acquiring method according to an embodiment of the present disclosure. As shown in FIG. 4, the method further includes the following.

At step S7, if among the plurality of pieces of second capability information there is no target capability information, i.e., second capability information that satisfies the preset requirements, any difference between the preset requirements and the capabilities of the first network side device are determined based on the first capability information (information indicating capability of the first network-side device) and the preset requirements. This difference is referred to herein as a 'difference requirement.'

At step S8, difference capability information, i.e., information that indicates a network side device has a capability to satisfy the difference requirement, is determined from the plurality of pieces of second capability information. At step S9, according to the difference capability information and the first capability information (information indicating capability of the first network side device), the to-be-processed data is divided into first data, i.e., data that is to be processed by the first network side device, and second data, i.e., data that is to be processed by a second network side device (difference network side device) that will make up the difference between the requirements and the capabilities of the first network side device. The difference network side device is the device corresponding to the difference capability information. At step S10, the second data is sent to the difference network side device for processing. At step S11, the first data is processed by the first network side device.

In some examples, if no target capability information that satisfies the preset requirements is determined from the plurality of pieces of second capability information, the difference requirements are determined based on the first capability information and the preset requirements. For example, the preset requirements include a speed requirement for processing to-be-processed data, which is for example, 200M/s. The first capability information indicates the speed of the first network side device (first speed) for processing data is 100M/s. Since the first speed 100M/s is less than the speed preset requirement of 200M/s, it is clear that processing the to-be-processed data by the first network side device by itself is not enough to satisfy the preset speed requirement. In that case, the target capability information, i.e., information that indicates a capability that satisfies the preset requirements, is determined from the plurality of pieces of second capability information.

For example, if the second capability information indicates speed capabilities of second network side devices (second speed capability) for processing to-be-processed data, but each indicated second speed capability is less than 200M/s, then there is no target capability information that indicates a second network side device has a capability to satisfy the preset requirements in the plurality of pieces of second capability information. In that case, the difference between the speed capability of the first network side device for processing the to-be-processed data, and the preset speed capability requirement can be determined. For example, the first speed capability of 100M/s can be subtracted from the preset speed requirement of 200M/s to obtain the difference capability information, i.e., 100M/s. Therefore, a second network side device with a processing capability of 100M/s, in addition to the first network side device are required for processing the to-be-processed data.

The difference capability information that satisfies the difference requirements can be determined from the plurality of pieces of second capability information. For example, if a piece of second capability information indicates a second network side device has a capability for processing data at a speed greater than or equal to 100M/s, this piece of second capability information is the difference capability information. The difference network side device is a second network side device that corresponds to the difference capability information.

It should be noted that if there is an additional second network side device in at least one second network side device which has a processing capability that can satisfy the difference requirements based on the difference capability information, the additional second network side device can be determined as the difference network side device.

However, in some cases, if the processing capability of the additional second network side device in the at least one second network side device is not enough to satisfy the difference requirements, a plurality of second network side devices can be determined as difference network side devices. In this case, a sum of the capabilities indicated in the second capability information corresponding to the capabilities of each of the determined plurality of network side devices satisfies the difference requirements.

Further, according to the difference capability information and the first capability information, the to-be-processed data can be divided into first data that is to be processed by the first network side device, and second data that is to be processed by the difference network side device. For example, both the difference capability information and the first capability information can be 100M/s. In this case, the to-be-processed data could be equally divided into two parts, a first half, which is the first data, and a second half which is the second data. The first data is processed by the first network side device. The other half is the second data, is sent to the difference network side device for processing.

Accordingly, in the case where processing to-be-processed data by the first network side device by itself, or the second network side device by itself does not satisfy the preset requirements, the to-be-processed data can be divided into a plurality of copies and the first network side device and the second network side device can process respective corresponding portions of the to-be-processed data so as to satisfy the preset requirements for processing the to-be-processed data.

FIG. 5 is a flowchart of a method for determining, from a plurality of pieces of second capability information, target capability information, i.e., information that satisfies preset requirements, according to an embodiment of the present disclosure. As shown in FIG. 5, the preset requirements include a plurality of sub-requirements. Determining the target capability information (second capability information that satisfies the preset requirements from the plurality of pieces of second capability information) includes step S301. Step 301 determines which of the pieces of second capability information, satisfy a greatest number of sub-requirements in the plurality of sub-requirements. Those determined pieces of second capability information become the target capability information.

In some examples, the preset requirements can include the plurality of sub-requirements. In an example, there are two sub-requirements. On sub-requirement is a required speed for processing to-be-processed data. Another sub-requirement is a specified amount of to-be-processed data that is required to be processed. For instance, the required speed for processing the to-be-processed data is 200M/s and the amount of the to-be-processed data is 2G. In that case, the method determines which of the pieces of second capability information indicate a corresponding second network side device having capabilities that satisfy the most sub-requirements. That second capability information is the target capability information.

In an example, the first network side device acquires the second capability information of two second network side devices device A and device B. Second capability information A indicates the speed capability of device A for processing data is 100M/s, and further indicates the amount of data that can be processed by device A is 3G. Second capability information B indicates the speed of device B for processing data is 100M/s and the amount of data that can be processed by device B is 1G.

In this case, 3G>2G. From this it can be determined that second capability information A indicates device A can satisfy one sub-requirement, i.e., the requirement to process 3G of data. The second capability information B indicates device B does not have capability to satisfy either of the sub-requirements. Therefore, between the two pieces of second capability information, second capability information A satisfies the most sub-requirements. Accordingly, the second capability information A is determine to be the target capability information, thereby ensuring that the to-be-processed data is sent for processing to the target network side device (device A) corresponding to the target capability information, and further ensuring that the processing result satisfies the preset requirements to the greatest possible extent.

FIG. 6 is a flowchart of steps for determining which of a plurality of pieces of second capability information satisfies preset requirements, so as to be determined as the target capability information. As shown in FIG. 6, the first request further includes priority information for each of a plurality of sub-requirements. The method includes determining, from the plurality of pieces of second capability information, a plurality of pieces of candidate capability information that satisfy the most sub-requirements, wherein determining the target capability information from the plurality of pieces of second capability information further includes, at step S302, determining particular ones of the sub-requirements that are satisfied by corresponding ones of the plurality of pieces of candidate capability information. from the plurality of pieces of second capability information further includes, at step S302, determining particular ones of the sub-requirements that are satisfied by corresponding ones of the plurality of pieces of candidate capability information.

At step S303, of the particular ones of the sub-requirements determined at step S302, a sub-requirement with a highest priority is determined. At step S304, from the plurality of pieces of candidate capability information, candidate capability information that satisfies the sub-requirement with the highest priority is determined. This candidate capability information becomes the target capability information.

In examples in which the preset requirements include a plurality of sub-requirements, the first network side device can determine the priority of each sub-requirement based on the priority information of each sub-requirement included in the first request. On the basis of the embodiment shown in FIG. 5, the preset requirements can include any number of sub-requirements. For example, there can be two sub-requirements, which can be the speed for processing to-be-processed data and the amount of the to-be-processed data. In this example, the speed for processing the to-be-processed data can be 200M/s, and the amount of the to-be-processed data can be 2G. In the example, the speed requirement for processing the to-be-processed data has a lower priority than the priority of the requirement for processing 2G of data. In other words, the amount of the to-be-processed data has a higher priority than the speed.

In other examples the first network side device acquires three pieces of second capability information. For instance, in addition to the second capability information A and the second capability information B, second capability information C is included. Second capability information C indicates a device C has a capability for processing data at a speed of 300M/s, and a capability to process 1G of data. In this example 300M/s>200M/s. Thus, it can be determined that the second capability information A satisfies one sub-requirement, and the second capability information C also satisfies one sub-requirement. Therefore, the second capability information A and the second capability information C satisfy the most sub-requirements, and these can be used as the candidate capability information.

For the plurality of pieces of candidate capability information, the candidate capability information that satisfies the sub-requirement with the highest priority can be determined as the target capability information. Since in this example, the amount of the to-be-processed data has a higher priority than the speed, and the second capability information A satisfies the requirement of the amount of to-be-processed data, the second capability information A can be determined as the target capability information. Accordingly, the to-be-processed data is sent for processing to the second network side device corresponding to the second capability information A.

According to the technique describe above, a user can set a priority for each of a plurality of sub-requirements as desired. From the plurality of pieces of second information, the first network side device can determine which of a plurality of pieces of candidate capability information satisfies the most sub-requirements. The first network side device can determine the second network side device according to the priority of each sub-requirement, so that the determined second network side device will be a device that can satisfy the sub-requirement that has the highest priority, thereby satisfying the user requirement with the highest priority.

FIG. 7 shows a step in a process for determining which of a plurality of pieces of second capability information will be determined as target capability information, i.e., second capability information that indicates a second-network side device that satisfies preset capability requirements.

As shown in FIG. 7, the preset requirements include a plurality of sub-requirements and the first request includes priority information for each of the plurality of sub-requirements.

The process of determining which of the plurality of pieces of second capability information will be determined as the target capability information, i.e., the second capability information that satisfies the preset requirements, includes: at step S305, from the plurality of pieces of second capability information, second capability information that satisfies a sub-requirement with a highest priority is determined as the target capability information. In some examples, the preset requirements can include the plurality of sub-requirements. The first network side device can determine the priority of each sub-requirement based on the priority information for each sub-requirement included in the first request.

In an example, the preset requirements include two sub-requirements, which are the speed for processing the to-be-processed data, and the amount of the to-be-processed data. The speed requirement for processing the to-be-processed data is 200M/s, and the amount requirement of the to-be-processed data is 2G. The speed requirement has a lower priority than that of the amount requirement.

In the example, the first network side device acquires two pieces of second capability information. These are the second capability information A with the speed for processing data being 100M/s and the amount of data that can be processed being 3G, and the second capability information C with the speed for processing data being 300M/s and the amount of data that can be processed being 1G. From this it can be determined that the second capability information A satisfies the sub-requirement with the highest priority, that is, the requirement of the to-be-processed data for data amount. Thus, in this case the second capability information A is be determined as the target capability information. Accordingly, the to-be-processed data is sent for processing to the second network side device that corresponds to the second capability information A.

Using the process described above, a user can set a priority of each sub-requirement as desired. The first network side device can determine the second network side device according to the priority of each sub-requirement. Therefore, the determined second network side device is a device that can satisfy the sub-requirement with the highest priority, thereby satisfying the user requirement with the highest priority.

Figure 8:
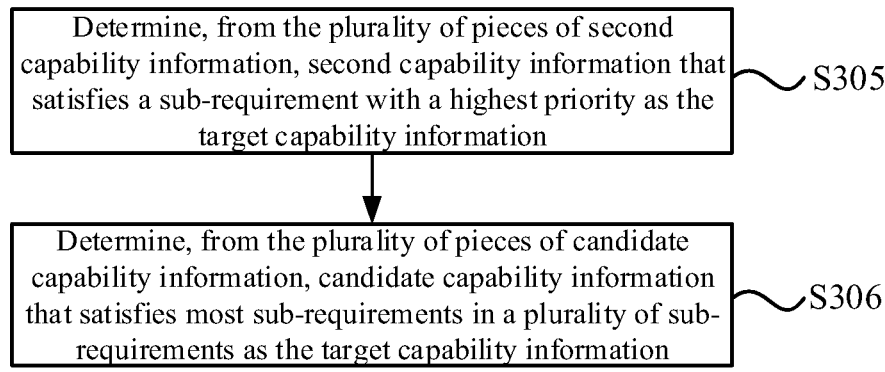
FIG. 8 is a flowchart of determining target capability information that satisfies preset requirements from a plurality of pieces of second capability information according to an embodiment of the present disclosure.

FIG. 8 is a flowchart of determining which of a plurality of pieces of second capability information, will be determined as target capability information, i.e., second capability information that satisfies preset requirements, according to an embodiment of the present disclosure. As shown in FIG. 8, determining which of the plurality of pieces of second capability information will be the target capability information, i.e., the second capability information that satisfies the preset requirements, further includes, at step S306, candidate capability information that satisfies the most sub-requirements of a plurality of sub-requirements is determined from the plurality of pieces of candidate capability information. The candidate capability information that satisfies the most sub-requirements becomes the target capability information.

In some examples as discussed above, sub-requirements have user-assigned priorities. In that case, of the plurality of pieces of candidate capability information that satisfy the sub-requirement, those with the highest priority are determined, and those pieces of candidate capability information become the target capability information. In that manner the to-be-processed data can be processed by the target network side device corresponding to the target capability information, and the preset requirements can be satisfied to the greatest extent.

In some examples, the second capability information includes at least one of the following: a speed capability, a latency capability or a data amount capability. In this context the term 'speed' specifically refers to the data processing speed. The term 'latency' specifically refers to the data processing latency, and the term 'data amount' specifically refers to the amount of data that can be processed.

Figure 9:
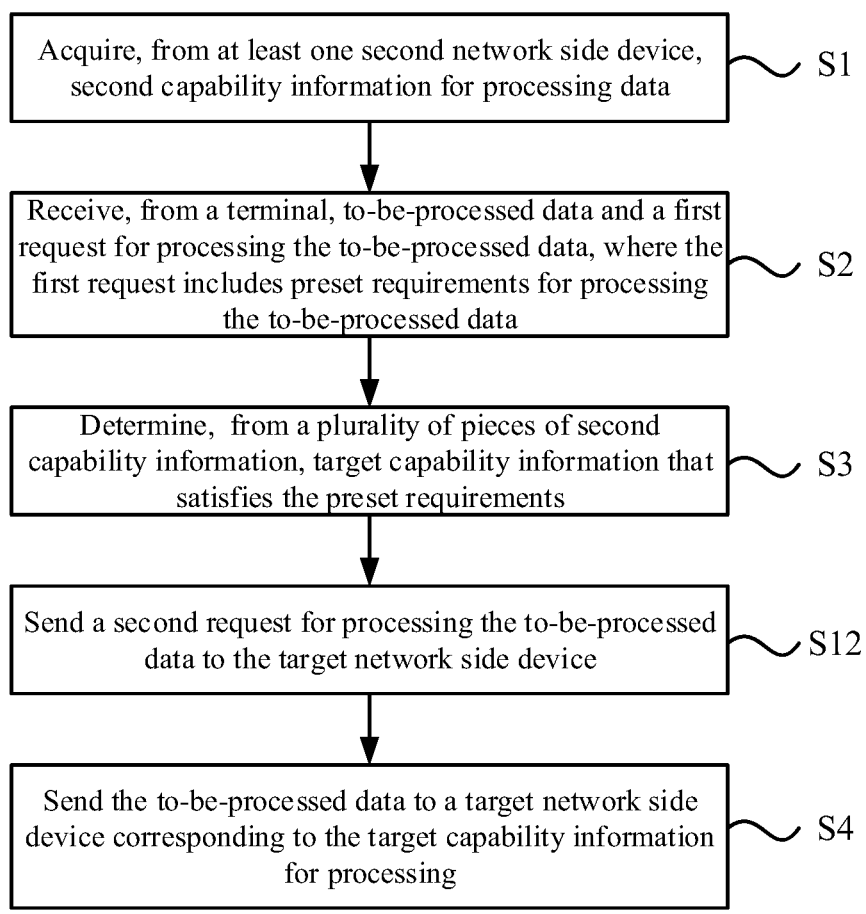
FIG. 9 is a flowchart illustrating another information acquiring method according to an embodiment of the present disclosure.

FIG. 9 is a schematic flowchart illustrating another information acquiring method according to an embodiment of the present disclosure. As shown in FIG. 9, the method further includes, before sending the to-be-processed data to the target network side device for processing: at step S12, sending to the target network side device, a second request for processing the to-be-processed data. If permission information for the second request is received, the to-be-processed data is sent to the target network side device for processing.

In some instances, a second network side device is not allowed to receive to-be-processed data sent by the first network side device at any time (for example, the second network side device is being occupied to process other services). In those instances, the first network side device, after determining the target network side device from a plurality of second network side devices, can later send a second request for processing the to-be-processed data to the target network side device.

When the target network side device receives the second request, if it is allowed to receive the to-be-processed data to be sent by the first network side device, it can send to the first network side device, permission information granting the second request. The first network side device, after receiving the permission information for the second request, can determine that the target network side device is now allowed to receive the to-be-processed data sent by the first network side device, and the first network side device then sends the to-be-processed data to the target network side device for processing.

Figure 10:
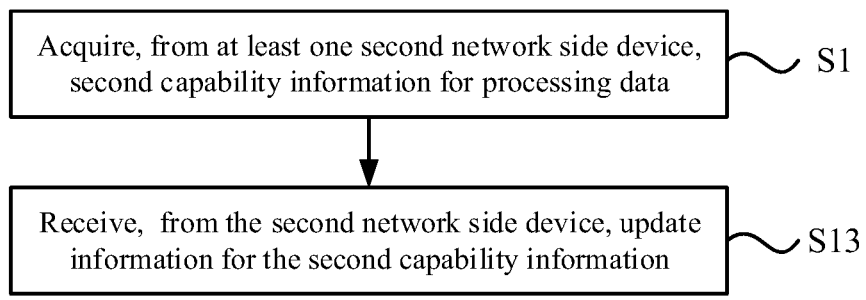
FIG. 10 is a flowchart illustrating another information acquiring method according to an embodiment of the present disclosure.

FIG. 10 is a flowchart illustrating another information acquiring method according to an embodiment of the present disclosure. As shown in FIG. 10, the method further includes step S13, in which update information for the second capability information sent by the second network side device is received.

In some examples, when the second capability information of the second network side device changes, the update information for the second capability information can be sent to the first network side device. For example, the update information for the second capability information can be carried in a message NG-RAN NODE CONFIGURATION UPDATE, and the updated second capability information is indicated to the first network side device through the update information, so that the first network side device can accurately determine the capability of the second network side device for processing data according to the updated second capability information.

Figure 11:
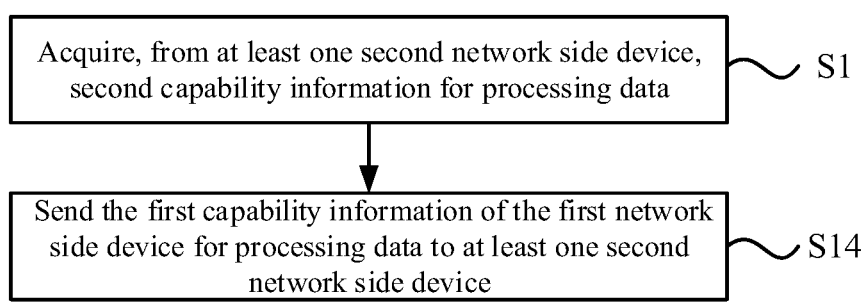
FIG. 11 is a flowchart illustrating another information acquiring method according to an embodiment of the present disclosure.

FIG. 11 is a flowchart illustrating another information acquiring method according to an embodiment of the present disclosure. As shown in FIG. 11, the method further includes at step S14, sending to at least one second network side device, first capability information of the first network side device for processing data. In some examples the first network side device can send the first capability information to the second network side device. When there is to-be-processed data in the second network side device, the second network side device can determine, according to the first capability information, whether the to-be-processed data is to be sent to the first network side device for processing. In this case, the second network side device can be used in place of the second network side device in the embodiment shown in FIG. 1.

Figure 12:
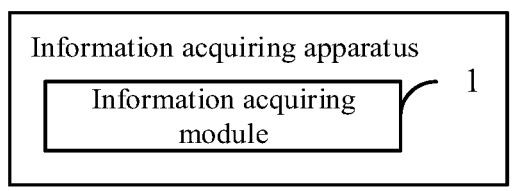
FIG. 12 is a block diagram illustrating an information acquiring apparatus according to an embodiment of the present disclosure.

The present disclosure further provides information acquiring apparatus embodiments corresponding to the information acquiring method embodiments. FIG. 12 is a block diagram illustrating an information acquiring apparatus according to an embodiment of the present disclosure. The information acquiring apparatus illustrated in this embodiment can be implemented in a first network side device.

The first network side device includes, but is not limited to, a base station, a core network and a multi-access edge computing server. The first network side device can communicate with a terminal which can comprise user equipment. The terminal includes, but is not limited to, an electronic device such as a mobile phone, a tablet computer and a wearable device. The first network side device and the terminal can communicate with each other based on 4G LTE (Long Term Evolution) or 5G NR (New Radio) technologies.

The terminal and the first network side device can have an AI (Artificial Intelligence) capability. Based on the AI capability, the terminal can quickly process information such as images, videos, languages and texts so as to quickly respond to user operations. The first network side device can process a larger amount of data than the terminal and can also have a quicker processing speed than the terminal. For example, the first network side device can process a large amount of data as a sample for machine learning to generate a model for processing data.

Figure 13:
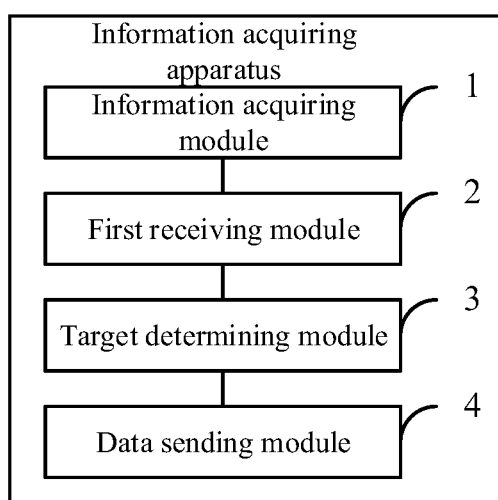
FIG. 13 is a block diagram illustrating another information acquiring apparatus according to an embodiment of the present disclosure.

As shown in FIG. 12, the information acquiring apparatus may include an information acquiring module 1 configured to acquire second capability information for processing data sent by at least one second network side device. FIG. 13 is a block diagram illustrating another information acquiring apparatus according to an embodiment of the present disclosure. As shown in FIG. 13, the apparatus further includes a first receiving module 2 configured to receive from a terminal, to-be-processed data and a first request for processing the to-be-processed data. The first request includes preset requirements for processing the to-be-processed data. The apparatus further includes a target determining module 3 configured to determine which of a plurality of pieces of second capability information satisfies the preset requirements. Those pieces of second capability information become the target capability information. The apparatus further includes
a data sending module 4 configured to send for processing, the to-be-processed data to a target network side device corresponding to the target capability information.

Figure 14:
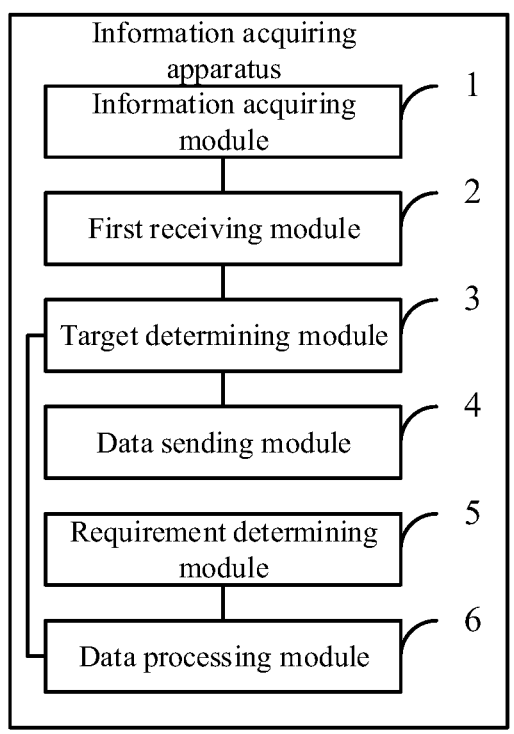
FIG. 14 is a block diagram illustrating another information acquiring apparatus according to an embodiment of the present disclosure.

FIG. 14 is a block diagram illustrating another information acquiring apparatus according to an embodiment of the present disclosure. As shown in FIG. 14, the apparatus further includes a requirement determining module 5 configured to determine whether first capability information indicates the first network side device has a data processing capability that satisfies the preset requirements. The apparatus further includes a data processing module 6 configured to process the to-be-processed data if the first capability information satisfies the preset requirements. A target determining module 3 is configured to determine which of a plurality of pieces of second capability information satisfy the preset requirements in case the first capability information does not satisfy the preset requirements. The pieces of second capability information determined to satisfy the preset requirements become the target capability information.

Figure 15:
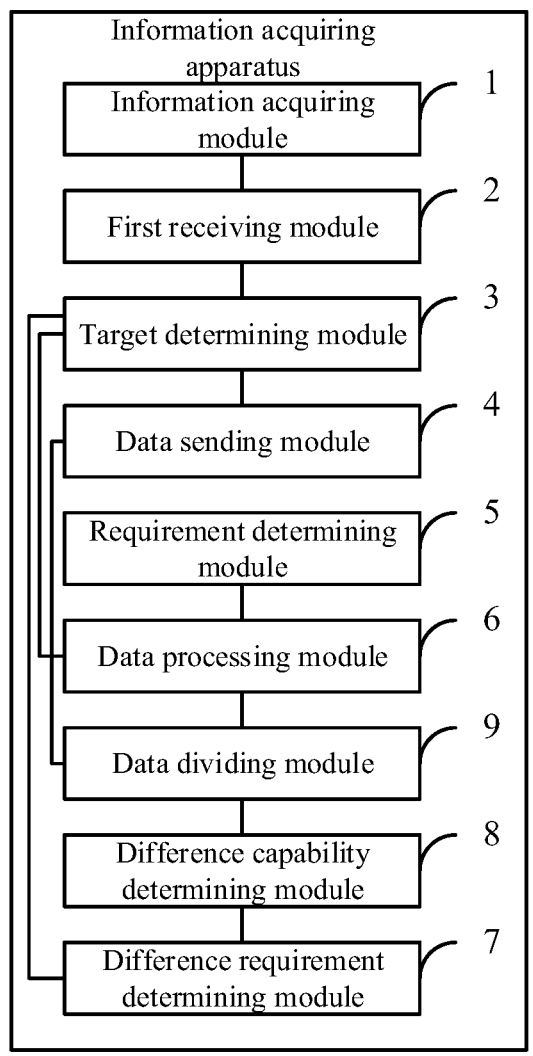
FIG. 15 is a block diagram illustrating another information acquiring apparatus according to an embodiment of the present disclosure.

FIG. 15 is a schematic block diagram illustrating another information acquiring apparatus according to an embodiment of the present disclosure. As shown in FIG. 15, the apparatus further includes a difference requirement determining module 7 configured to, in case there is no target capability information that satisfies the preset requirements in a plurality of pieces of second capability information, determine differences between the capabilities of the first device for processing the to-be-processed data as indicated in the first capability information, and the preset capability requirements for processing the to-be-processed data. Differences between the capabilities and the requirements are determined to be 'difference requirements.'

The apparatus further includes a difference capability determining module 8 configured to determine which of the plurality of pieces of second capability information satisfy the difference requirements. Those of the plurality of pieces of second capability information that satisfy the difference requirements are determined to be 'difference capability information.'

The apparatus further includes a data dividing module 9 configured to divide, based on the difference capability information and the first capability information, the to-be-processed data into first data that is to be processed by the first network side device, and second data that is to be processed by a difference network side device corresponding to the difference capability information, where the data sending module 4 is further configured to send the second data to the difference network side device for processing. The data processing module 6 is configured to process the first data. In some examples, the preset requirements include a plurality of sub-requirements. In those examples the target determining module is configured to determine which of the plurality of pieces of second capability information satisfies the most sub-requirements of the plurality of sub-requirements. Those pieces of second capability information become the target capability information.

Figure 16:
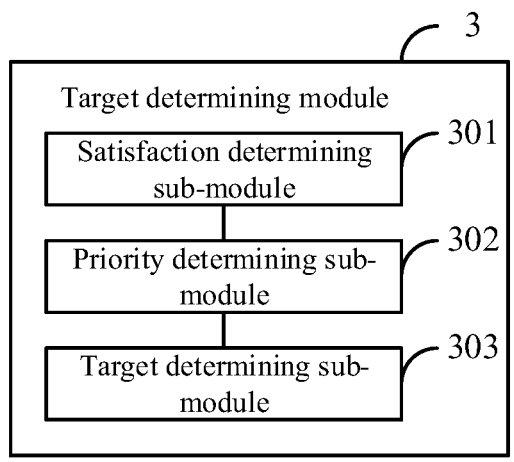
FIG. 16 is a block diagram illustrating a target determining module according to an embodiment of the present disclosure.

FIG. 16 is a block diagram illustrating a target determining module according to an embodiment of the present disclosure. As shown in FIG. 16, the first request further includes priority information for each sub-requirement. In that case those of the plurality of pieces of second capability information that satisfy the most sub-requirements are candidate capability information. The determining module 3 further includes a satisfaction determining sub-module 301 configured to determine from the sub-requirements satisfied by the plurality of pieces of candidate capability information, those sub-requirements that are satisfied by the plurality of pieces of candidate capability information.

A priority determining sub-module 302 is configured to determine which of those sub-requirements has a highest priority. A target determining sub-module 303 is configured to determine which pieces of the plurality of pieces of candidate capability information satisfy the sub-requirement with the highest priority. Those pieces that satisfy the highest priority sub-requirement become the target capability information.

In some examples, the preset requirements include a plurality of sub-requirements. In those examples the first request further includes priority information for each sub-requirement. The target determining module is configured to determine which pieces of the plurality of pieces of second capability information satisfy a sub-requirement with a highest priority. Those pieces that satisfy the highest priority sub-requirement become the target capability information. In some examples, the target determining module is further configured to determine which of the plurality of pieces of candidate capability information is the candidate capability information that satisfies most sub-requirements of the plurality of sub-requirements. The candidate capability information that satisfies the most sub-requirements is the target capability information.

Figure 17:
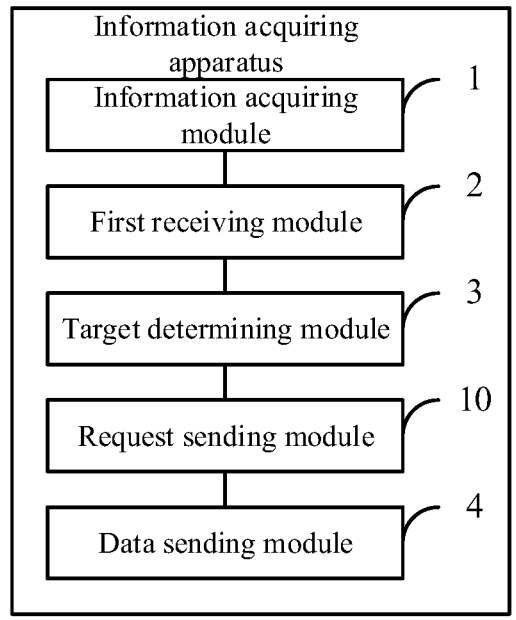
FIG. 17 is a block diagram illustrating another information acquiring apparatus according to an embodiment of the present disclosure.

FIG. 17 is a schematic block diagram illustrating another information acquiring apparatus according to an embodiment of the present disclosure. As shown in FIG. 17, the apparatus further includes a request sending module 10 configured to send to the target network side device, a second request for processing the to-be-processed data. In case of the information acquiring apparatus receiving permission information in response to sending the second request, the data sending module 6 is configured to send the to-be-processed data to the target network side device for processing. In some examples, the second capability information includes at least one of the following: a speed, a latency or a data amount.

Figure 18:
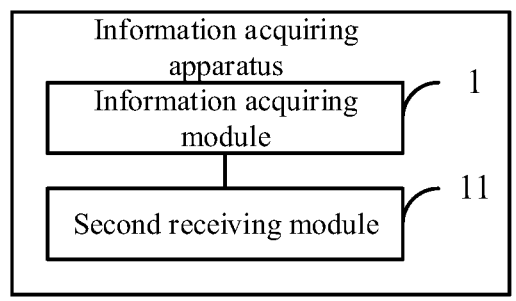
FIG. 18 is a block diagram illustrating another information acquiring apparatus according to an embodiment of the present disclosure.

FIG. 18 is a block diagram illustrating another information acquiring apparatus according to an embodiment of the present disclosure. As shown in FIG. 18, the apparatus further includes a second receiving module 11 configured to receive from the second network side device, update information for the second capability information.

Figure 19:
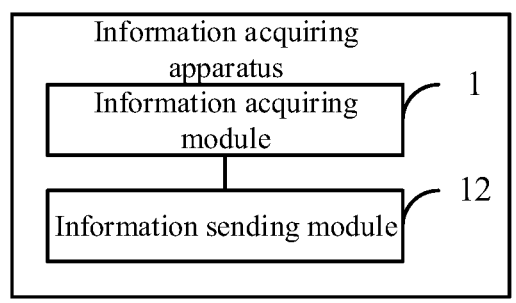
FIG. 19 is a block diagram illustrating another information acquiring apparatus according to an embodiment of the present disclosure.

FIG. 19 is a schematic block diagram illustrating another information acquiring apparatus according to an embodiment of the present disclosure. As shown in FIG. 19, the apparatus further includes an information sending module 12 configured to send to at least one second network side device, the first capability information of the first network side device for processing data.

Regarding the apparatuses in the above embodiments, the specific manners in which each module performs operations have been described in detail in the related method embodiments, and will not be repeated here. The apparatus examples correspond in function to the steps in the method examples. Therefore, reference may be made to the portions of the descriptions of steps in the method examples corresponding to the actions or functions performed by the apparatus examples.

The apparatus examples described above are merely illustrative. The modules described as separate components may or may not be physically separated, and the components illustrated as modules may be located in one place or may be distributed to a plurality of network modules. Some or all of the modules may be selected according to actual needs to achieve the objectives of the present disclosure. Those of ordinary skill in the art can understand and implement the present disclosure without any creative effort.

Figure 20:
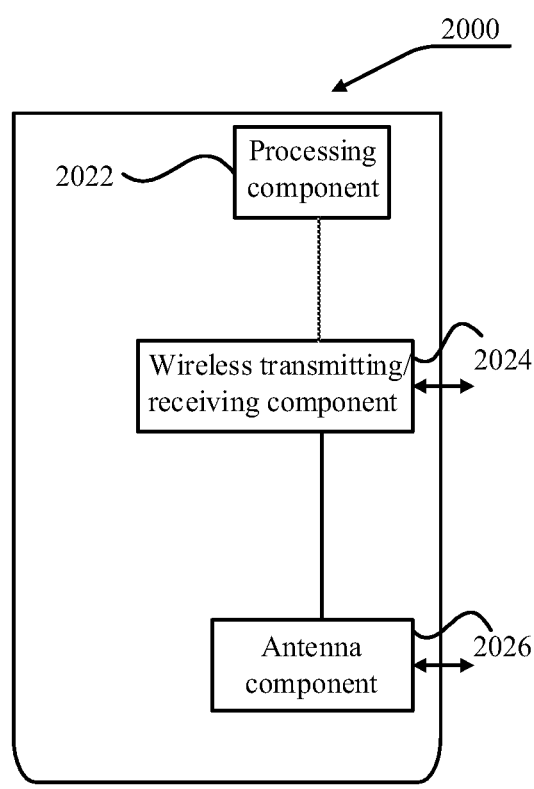
FIG. 20 is a structural diagram illustrating an apparatus for information acquisition according to an embodiment of the present disclosure.

FIG. 20 is a schematic structural diagram illustrating an apparatus 2000 for information acquisition according to an embodiment of the present disclosure. The apparatus 2000 can be provided to a network side device such as a base station, a core network and a multi-access edge computing server. With reference to FIG. 20, the apparatus 2000 includes a processing component 2022, a wireless transmitting/receiving component 2024, an antenna component 2026, and a signal processing portion specific to a wireless interface. The processing component 2022 may further include one or more processors. One of the processors in the processing component 2022 may be configured to implement the information acquiring method described in any of the embodiments.

Other embodiments of the present disclosure will be readily apparent to those skilled in the art after considering the specification and practicing the contents disclosed herein. The present disclosure is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The methods and apparatuses provided in the embodiments of the present disclosure have been introduced in detail above. Specific examples are used herein to illustrate the principle and manner of implementation of the present disclosure. At the same time, those skilled in the art, upon reading the embodiments described herein, will recognize many variations in the specific implementation not explicitly described but nonetheless within the spirit and scope of this disclosure. In conclusion, the specific examples described in the specification should not be construed as limitation on the scope of the present disclosure.

The invention claimed is:

1. An information acquiring method, comprising:
   acquiring, by a first network side device from more than one second network side device, second capability information for processing data; and
   receiving, from a terminal, to-be-processed data and a first request for processing the to-be-processed data, wherein the first request comprises preset requirements for processing the to-be-processed data;
   determining whether first capability information of the first network side device satisfies the preset requirements;
   in response to determining that the first capability information does not satisfy the preset requirements, determining, from a plurality of pieces of second capability information, target capability information that satisfies the preset requirements; and
   sending the to-be-processed data to a target network side device corresponding to the target capability information for processing.

2. The method of claim 1, wherein the method further comprises:
   in response to determining that the first capability information satisfies the preset requirements, processing the to-be-processed data.

3. The method of claim 2, further comprising:
   in response to determining that no target capability information satisfies the preset requirements, determining, according to the first capability information and the preset requirements, difference requirements comprising differences between the capabilities of the first network side device for processing the to-be-processed data and the preset requirements;
   determining, from the plurality of pieces of second capability information, difference capability information that satisfies the difference requirements;
   dividing, according to the difference capability information and the first capability information, the to-be-processed data into first data that is to be processed by the first network side device, and second data that is to be processed by a difference network side device corresponding to the difference capability information;
   sending the second data to the difference network side device for processing; and
   processing the first data.

4. The method of claim 1, wherein the preset requirements comprise a plurality of sub-requirements, and wherein determining the target capability information comprises: determining, from the plurality of pieces of second capability information, target capability information comprising second capability information that satisfies most sub-requirements in the plurality of sub-requirements.

5. The method of claim 4, wherein the method further comprises, in response to determining a plurality of pieces of candidate capability information comprising those of the plurality of pieces of second capability information that satisfy the most sub-requirements:
   determining which sub-requirements of the plurality of sub-requirements are satisfied by the plurality of pieces of candidate capability information;
   determining a sub-requirement with a highest priority from the sub-requirements; and
   determining target capability information by determining, which of the plurality of pieces of candidate capability information satisfy the sub-requirement with the highest priority.

6. The method of claim 1, wherein the preset requirements comprise a plurality of sub-requirements; wherein the first request further comprises priority information of each sub-requirement; and wherein determining the target capability information further comprises: determining target capability information comprising pieces of the plurality of pieces of second capability information that satisfy a sub-requirement with a highest priority.

7. The method of claim 6, wherein the method further comprises, in response to determining a plurality of pieces of candidate capability information comprising those of from the plurality of pieces of second capability information that satisfy the sub-requirement with the highest priority:
   determining, from the plurality of pieces of candidate capability information, the target capability information comprising candidate capability information that satisfies most sub-requirements in the plurality of sub-requirements.

8. The method of claim 1, wherein before sending the to-be-processed data to the target network side device for processing, the method further comprises:
   sending a second request for processing the to-be-processed data to the target network side device; and
   in response to receiving permission information for the second request, sending the to-be-processed data to the target network side device for processing.

9. The method of claim 1, wherein the second capability information comprises at least one of the following: a speed, a latency or a data amount.

10. The method of claim 1, further comprising: receiving update information for the second capability information sent by the second network side device.

11. The method of claim 1, further comprising: sending the first capability information of the first network side device for processing data to the more than one second network side device.

12. An electronic device, comprising:
    a processor; and
    a non-transitory computer-readable storage medium for storing processor executable instructions;
    wherein the processor is configured to:
    acquire, by a first network side device from more than one second network side device, second capability information for processing data; and
    receive, from a terminal, to-be-processed data and a first request for processing the to-be-processed data, wherein the first request comprises preset requirements for processing the to-be-processed data;
    determine whether first capability information of the first network side device satisfies the preset requirements;
    in response to determining that the first capability information does not satisfy the preset requirements, determine, from a plurality of pieces of second capability information, target capability information that satisfies the preset requirements; and
    send the to-be-processed data to a target network side device corresponding to the target capability information for processing.

13. The electronic device of claim 12, wherein, the processor is further configured to:
    in response to determining that the first capability information satisfies the preset requirements, process the to-be-processed data.

14. The electronic device of claim 13, wherein the processor is further configured to:
  in response to determining that no target capability information satisfies the preset requirements, determine, according to the first capability information and the preset requirements, difference requirements comprising differences between the capabilities of the first network side device for processing the to-be-processed data and the preset requirements;
  determine, from the plurality of pieces of second capability information, difference capability information that satisfies the difference requirements;
  divide, according to the difference capability information and the first capability information, the to-be-processed data into first data that is to be processed by the first network side device, and second data that is to be processed by a difference network side device corresponding to the difference capability information;
  send the second data to the difference network side device for processing; and
  process the first data.

15. The electronic device of claim 12, wherein the preset requirements comprise a plurality of sub-requirements, and when determining the target capability information, the processor is configured to: determine, from the plurality of pieces of second capability information, target capability information comprising second capability information that satisfies most sub-requirements in the plurality of sub-requirements.

16. The electronic device of claim 15, wherein the processor is further configured to, in response to determining a plurality of pieces of candidate capability information comprising those of the plurality of pieces of second capability information that satisfy the most sub-requirements:
  determine which sub-requirements of the plurality of sub-requirements are satisfied by the plurality of pieces of candidate capability information;
  determine a sub-requirement with a highest priority from the sub-requirements; and
  determine target capability information by determining, which of the plurality of pieces of candidate capability information satisfy the sub-requirement with the highest priority.

17. The electronic device of claim 16, wherein the preset requirements comprise a plurality of sub-requirements; wherein the first request further comprises priority information of each sub-requirement; and when determining the target capability information, the processor is further configured to:
  determine target capability information comprising pieces of the plurality of pieces of second capability information that satisfy a sub-requirement with a highest priority.

18. The electronic device of claim 17, wherein the processor is further configured to, in response to determining a plurality of pieces of candidate capability information comprising those of from the plurality of pieces of second capability information that satisfy the sub-requirement with the highest priority: determine, from the plurality of pieces of candidate capability information, the target capability information comprising candidate capability information that satisfies most sub-requirements in the plurality of sub-requirements.

* * * * *